Figure 1:
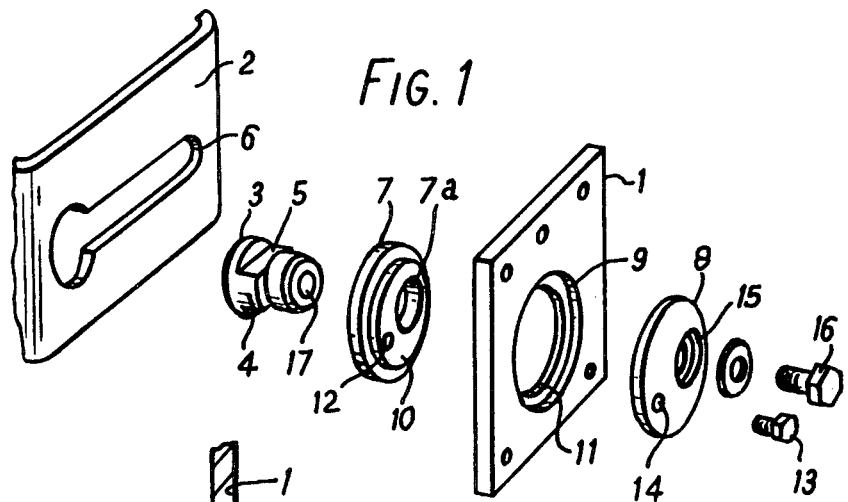

United States Patent [19]

Tregoning

[11] 4,106,876

[45] Aug. 15, 1978

[54] DOOR MOUNTINGS

[75] Inventor: Geoffrey Robinson Tregoning, London, England

[73] Assignee: Westinghouse Brake and Signal Company Limited, London, England

[21] Appl. No.: 745,866

[22] Filed: Nov. 29, 1976

[30] Foreign Application Priority Data

Dec. 20, 1975 [GB] United Kingdom ............... 52278/75

[51] Int. Cl.² .............................................. F16B 1/00
[52] U.S. Cl. ......................................... 403/4; 403/24; 16/105
[58] Field of Search ..................... 403/4, DIG. 8, 408, 403/24; 16/105, 99

[56] References Cited

U.S. PATENT DOCUMENTS

| Re. 25,246 | 9/1962 | Majeske | 16/105 |
|---|---|---|---|
| 1,357,771 | 11/1920 | Geiger | 16/99 |
| 2,432,733 | 12/1947 | Ditchfield | 16/99 |
| 2,999,267 | 9/1961 | Sterling et al. | 16/105 |
| 3,006,443 | 10/1961 | Siler | 403/408 |
| 3,142,859 | 8/1964 | Suska | 16/105 |
| 3,148,405 | 9/1964 | Dickinson et al. | 16/105 |
| 3,182,770 | 5/1965 | Shemet | 403/408 |
| 3,203,027 | 8/1965 | Ohman | 16/105 |

Primary Examiner—Andrew V. Kundrat
Attorney, Agent, or Firm—Larson, Taylor and Hinds

[57] ABSTRACT

A mounting device is provided for mounting a door to a door supporting mechanism, the device including a mounting member which is slideable in a slot and which projects to be rotatably engageable with an eccentric aperture in a further mounting member which when assembled is itself rotatably located in a further aperture, the arrangement affording easy levelling and positioning adjustment and locking means being provided for locking the members together after such adjustment.

6 Claims, 3 Drawing Figures

U.S. Patent  Aug. 15, 1978  4,106,876

DOOR MOUNTINGS

This invention relates to door mountings and relates especially but not exclusively to mountings for sliding doors for use in railway vehicles.

It has long been a problem with sliding door equipments for railway vehicles that not only have the adjustments to the mechanisms themselves required patience and concentration on the part of an assembler but also the mounting of the door with such equipments has required the extending of much time and care.

According to the present invention there is provided a door mounting device including when assembled, a first door part having an aperture, a mounting member rotatably mounted within said aperture, a second part having a slot, a further mounting member slideably mounted in said slot, said further mounting member extending from said slot to rotatably engage in an eccentric aperture in said mounting member, and means for locking said mounting member against rotation in said aperture.

Further means may be provided for locking the further mounting member relative to the second part. The first mounting member may comprise a spigot of generally cylindrical form of diameter greater than the slot width and having diametrically opposed flats locatable with the flanks of the slot. The second mounting member may comprise two generally disc-shaped portions clampable by a bolt passing therethrough into the first mounting member to clamp together the second part, a first of said discs, the first part and the second of said disc.

In a preferred arrangement, an assembly using the invention comprises two such mountings the respective slots being in a common second part and the respective apertures being provided in a common first part, a suitable means being provided for individual rotational adjustment of the respective mounting members.

Figure 2:
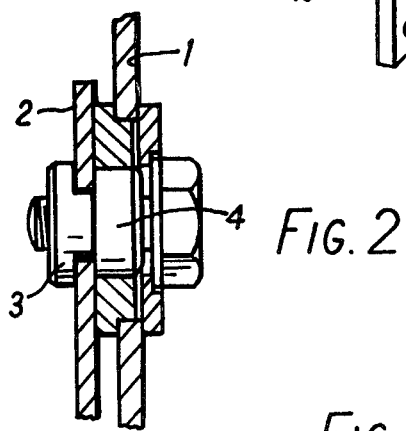
Figure 3:
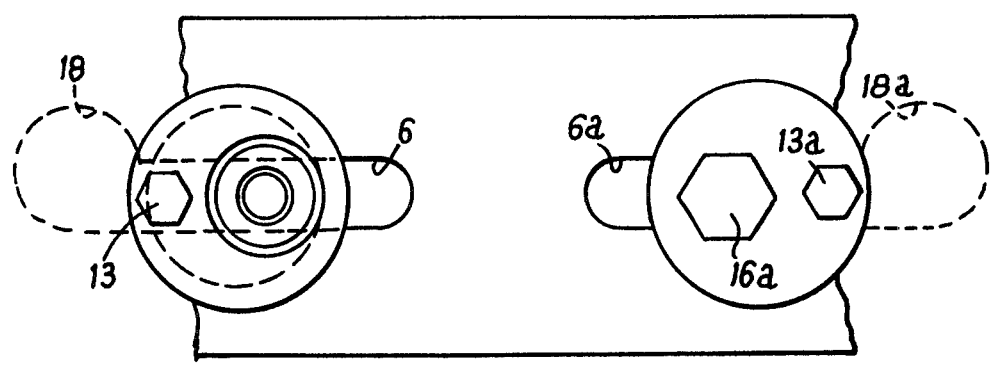

In order that the invention may be more clearly understood and readily carried into effect, the same will be further described by way of example with reference to the accompanying drawings of which:

FIG. 1 illustrates the various components of a door mounting in accordance with the invention, FIG. 2 illustrates a sectional view through a door mounting as shown in FIG. 1, and FIG. 3 illustrates in part sectional form a pair of mountings as they may preferably be arranged to mount the upper edge of a sliding door in a rail vehicle.

Mountings about to be described are suitable for mounting a door panel to a sliding door mechanism or a sliding-plug door mechanism for a rail vehicle. Such mechanisms are typically provided in a suitable recess at the head of a door opening and present appropriate mounting brackets or plates to which the door to be carried thereby can be suitably attached. Means is also normally provided for locating the lower edge of the door in relation to the threshold of the doorway to maintain complete alignment in relation to the door opening.

Referring to FIG. 1, assuming a rectangular door, the door may typically carry in the region of its upper corners a plate of the general form as shown by reference 1. Each such plate therefore becomes integral with the door which therefore constitutes a first part to be mounted to a second part one end of which is represented by reference 2 and comprises for each upper corner of the door, a plate carrying a slot of generally keyhole configuration and carried by the sliding door mechanism. The keyhole slot is such as to accept the head 3 of a generally cylindrical mounting member 4 having a pair of milled ways 5 to enable slideable location thereof within the slot 6. Another mounting member to be carried by the first part and more specifically the plate 1, comprises a pair of generally disc-shaped parts which are such as when assembled to be rotatably engageable in an aperture in the plate 1, the disc-shaped member 7 having a spigot 10 which extends not completely through a reduced diameter portion 11 of the aperture. The second mounting member comprising 7 and 8 is further provided with an aperture 7a which is eccentrically disposed in relation to the generally disc-shaped configuration of 7 and 8 and is also provided with a drilled and tapped hole 12 in the part 7 by which the portions 7 and 8 can be clamped by a bolt 13 passing through an aperture 14 in the portion 8. A recess 15 is provided in the portion 8 to accept a larger bolt 16 by which the whole assembly is clampable by 16 being tightened in a threaded hole 17 in the first mounting member.

The section of FIG. 2 shows a section which is eccentric to the extent that it passes through the centre of the mounting member 4 and shows the manner in which the parts are assembled. Referring to FIG. 3, the assembled mountings at the top corners of a rectangular door are shown diagrammatically and it will be seen that the respective slots 6 and 6a are handed such that before offering the door to the mechanism, the mounting members such as 4 can be inserted and passed along the respective slots but thereafter, after assembling the doors to the mounting means it is not possible for these heads of the mounting members to reach the wider regions 18 and 18a of the slots. On assembly, the positions of the mounting members are therefore suitably adjusted and the mounting means with their respective generally disc-shaped parts 7 and 8 assembled on either side of the respective plates 1 with bolts 13 loosely inserted, are offered up and engaged with the other mounting means followed by finger-tight insertion of the bolt 16. Levelling of the door is first achieved by a suitable key which engages the head of the bolts 13 and 16 enabling rotation of the mounting means 7 and 8 relative to the other mounting means, the respective bolts 13 thereafter being tightened to lock the discs relative to the first part, it is thereafter a simple matter to make lateral adjustments of the door during which adjustment by sliding in the slots 6 and 6a is, followed by final tightening of the respective bolts 16 and 16a the effect of which is not only to lock mounting members such as 4 relative to the second part in the slots 6 and 6a, but also to clamp the whole assembly finally together. Subsequent re-adjustment is readily achieved by loosening the respective bolts 13, 13a, 16, 16a and repeating the adjustment. Assuming moreover that the location of the lower edge of the door is readily dismantled, very rapid removal and replacement of door panels is achieved by use of the present invention for mounting amd adjustment of the doors.

Having thus described our invention what I claim is:

1. A door mounting device including when assembled, a first door part having an aperture, a mounting member rotatably mounted within said aperture, a second part having a slot, a further mounting member slideably mounted in said slot, said further mounting member extending from said slot to rotatably engage in an eccentric aperture in said mounting member, and means for locking said mounting member against rotation in said aperture.

2. A door mounting device as claimed in claim 1, including further locking means for locking the further mounting member to the second part.

3. A door mounting device as claimed in claim 2, the further mounting member comprising a spigot of generally cylindrical form, the diameter of which is greater than the slot width and being provided with opposed flats locatable with flanks of the slot.

4. A door mounting device as claimed in claim 2, the mounting member comprising two disc-shaped portions clampable by a bolt passing therethrough into the further mounting member to clamp together the second part, a first of said discs, the first part and the second of said discs.

5. A door mounting device as claimed in claim 4 comprising a bolt to clamp together the said two portions with the first part between them.

6. A door mounting device as claimed in claim 3, the flats being bounded on each end thereof by portions of diameters which cannot pass between the flanks of the slot.

* * * * *